United States Patent
Inoue

(10) Patent No.: US 8,350,686 B2
(45) Date of Patent: Jan. 8, 2013

(54) VEHICLE INFORMATION DISPLAY SYSTEM

(75) Inventor: Hidefumi Inoue, Saitama (JP)

(73) Assignee: Bosch Corporation, Tokyo (JP)

( * ) Notice: Subject to any disclaimer, the term of this patent is extended or adjusted under 35 U.S.C. 154(b) by 326 days.

(21) Appl. No.: 12/746,709

(22) PCT Filed: Nov. 4, 2008

(86) PCT No.: PCT/JP2008/070023
§ 371 (c)(1),
(2), (4) Date: Jun. 7, 2010

(87) PCT Pub. No.: WO2009/072366
PCT Pub. Date: Jun. 11, 2009

(65) Prior Publication Data
US 2010/0253494 A1   Oct. 7, 2010

(30) Foreign Application Priority Data
Dec. 5, 2007   (JP) ................................. 2007-314674

(51) Int. Cl.
*B60Q 1/00* (2006.01)
(52) U.S. Cl. ........ 340/436; 340/435; 340/903; 340/576; 701/301
(58) Field of Classification Search .................. 340/436, 340/435, 903, 425.5, 576; 701/300–302, 701/96
See application file for complete search history.

(56) References Cited

U.S. PATENT DOCUMENTS

| | | | |
|---|---|---|---|
| 6,859,144 B2 * | 2/2005 | Newman et al. | ............ 340/576 |
| 7,135,961 B1 | 11/2006 | Operowsky et al. | |
| 7,734,419 B2 * | 6/2010 | Kondoh | ........................ 701/301 |
| 2005/0134479 A1 | 6/2005 | Isaji et al. | |

FOREIGN PATENT DOCUMENTS

| | | |
|---|---|---|
| JP | 4349599 A | 12/1992 |
| JP | 6247184 A | 9/1994 |
| JP | 200219491 A | 1/2002 |
| JP | 2005011252 A | 1/2005 |
| JP | 2005182306 A | 7/2005 |
| JP | 2006215911 A | 8/2006 |
| JP | 2007008382 A | 1/2007 |
| JP | 2007034988 A | 2/2007 |
| JP | 2007272867 A | 10/2007 |

* cited by examiner

*Primary Examiner* — Anh V La
(74) *Attorney, Agent, or Firm* — Michael Best & Friedrich LLP

(57) ABSTRACT

A driver more reliably becomes aware, on a vehicle glass, of near-vehicle object information of which the driver should be aware. A vehicle information display system 10 is equipped with awareness information detecting unit 1 that detects information of an awareness object of which a driver should be aware near a host vehicle, eye position detecting unit 2 that detects the position of the eyes of the driver, and display unit 3 that displays on vehicle glasses 11, 12 and 13 at least one of the information of the awareness object that has been detected by the awareness information detecting unit 1 and an emphatic display. The display unit 3 displays, in an intersection where an axis interconnecting the position of the eyes of the driver that has been detected by the eye position detecting unit 2 and the awareness object of which the driver should be aware intersects the vehicle glasses 11, 12 and 13 or in a neighborhood of that intersection, the information of the awareness object detected by the awareness information detecting unit 1 or the emphatic display.

18 Claims, 12 Drawing Sheets

VEHICLE INFORMATION DISPLAY SYSTEM

TECHNICAL FIELD

The present invention relates to a vehicle information display system that displays, on a vehicle glass, information of an object near a host vehicle, for example.

BACKGROUND ART

Conventionally, there is known a vehicle display device that sets information about an object located in a line-of-sight direction of a driver on or in a nearby position of an axis in the line-of-sight direction of the driver on a front windshield (e.g., see patent document 1).

There is also known an on-vehicle display device that detects the position of a point of view of a driver to detect the line of sight of the driver and moves the position of and also adjusts the size of display information on a front windshield with respect to changes in that line of sight (e.g., see patent document 2).

Patent Document 1: JP-A-2002-19491
Patent Document 2: JP-A-6-247184

DISCLOSURE OF THE INVENTION

Problem to be Solved by the Invention

The conventional vehicle display device and on-vehicle display device described above acquire information of an object of which the driver should be aware on the basis of the line-of-sight direction of the driver. Consequently, for example, when the driver fails to see a near-vehicle object of which the driver should be aware, the line-of-sight of the driver is not directed toward this object. Thus, there is the fear that information of this object toward which the driver is not directing his/her line of sight will not be displayed on the front windshield despite it being information of which the driver should be aware.

The present invention has been made in view of the problem that the conventional technology described above has, and it is a main object of the present invention to provide a vehicle information display system with which a driver can more reliably become aware, on a vehicle glass, of near-vehicle object information of which the driver should be aware.

Means for Solving the Problem

One aspect of the present invention for achieving the object described above is a vehicle information display system comprising: awareness information detecting means that detects information of an awareness object of which a driver should be aware near a host vehicle; eye position detecting means that detects the position of the eyes of the driver; and display means that displays on a vehicle glass at least one of the information of the awareness object that has been detected by the awareness information detecting means and an emphatic display, wherein the display means displays, in an intersection where an axis interconnecting the position of the eyes of the driver that has been detected by the eye position detecting means and the awareness object of which the driver should be aware intersects the vehicle glass or in a neighborhood of that intersection, the information of the awareness object that has been detected by the awareness information detecting means and/or the emphatic display.

According to this one aspect, the driver can more reliably become aware, on the vehicle glass, of near-vehicle object information of which the driver should be aware.

In this one aspect, it is preferred that the vehicle information display system further comprises left/right turn detecting means that detects a left turn waiting state or a right turn waiting state of the host vehicle, and when the right turn waiting state has been detected by the left/right turn detecting means, the display means displays on a front windshield the information of the awareness object that is positioned behind an oncoming vehicle that is oncoming with respect to the host vehicle. Thus, the driver can reliably become aware of information of another vehicle of which the driver should be aware when making a right turn and which is normally hidden by an oncoming vehicle and of which it is impossible or difficult for the driver to be aware.

In this one aspect, it is preferred that the vehicle information display system further comprises left/right turn detecting means that detects a left turn waiting state or a right turn waiting state of the host vehicle, and when the left turn waiting state or the right turn waiting state has been detected by the left/right turn detecting means, the awareness information detecting means detects information of a pedestrian who is present on or near a path of travel when the host vehicle makes a left turn or a right turn, and the display means displays on a side window the information of the pedestrian or the emphatic display. Thus, the driver can more reliably become aware of information of a pedestrian of which the driver should be aware when making a left turn or a right turn.

In this one aspect, it is preferred that the awareness information detecting means detects information of an invisible object that is hidden behind an obstacle near the host vehicle and which the driver cannot see, and the display means displays on a front windshield or on a side window the information of the invisible object that has been detected by the awareness information detecting means. Thus, the driver can more reliably become aware of information of an invisible object of which the driver should be aware but which is hidden behind an obstacle and which the driver cannot inherently see.

In this one aspect, it is preferred that the awareness information detecting means detects traffic regulation information of a road on which the host vehicle travels, and the display means collectively displays, in a position offset by a predetermined amount from the intersection where the axis intersects the vehicle glass, the traffic regulation information that has been detected by the awareness information detecting means. Thus, the driver can easily and reliably become collectively aware of traffic regulation information of a road on which the host vehicle is currently traveling.

In this one aspect, it is preferred that the vehicle information display system further comprises left/right turn detecting means that detects that the host vehicle will make a left turn or a right turn, and when it has been detected by the left/right turn detecting means that the host vehicle will make a left turn or a right turn, the display means displays on a side window the traffic regulation information that regulates the left turn or the right turn of the host vehicle that has been detected by the awareness information detecting means. Thus, the driver can easily and reliably become aware of traffic regulations of which the driver should be aware when making a left turn or a right turn.

In this one aspect, it is preferred that the awareness information detecting means detects a rear vehicle that is approaching the host vehicle from behind, and when the approaching rear vehicle has been detected by the awareness information detecting means, the display means displays on a rear windshield information of the rear vehicle. Thus, the driver can easily and reliably become aware of information of a rear vehicle that is approaching the host vehicle.

In this one aspect, it is preferred that the awareness information detecting means has a collision judging unit that judges whether or not a rear vehicle that is approaching the host vehicle will collide with the host vehicle, and when it has been detected by the collision judging unit that the rear vehicle will collide with the host vehicle, the display means displays on a rear windshield information of the rear vehicle and the emphatic display. Thus, the driver can more reliably become aware of the potential for a rear vehicle to collide with the host vehicle.

In this one aspect, the information of the awareness object includes at least one of attribute information, velocity information, traveling direction information, position information and operation information of the awareness object, for example.

In this one aspect, it is preferred that the vehicle information display system further comprises right turn required-amount-of-time setting means that sets a right turn required-amount-of-time that is required for the driver to turn the host vehicle right, and the display means varies its display aspect when displaying the information of the awareness object on the vehicle glass on the basis of the right turn required-amount-of-time of the driver that has been set by the right turn required-amount-of-time setting means. Thus, when the driver turns the host vehicle right, the method of displaying the information of the awareness object of which the driver should be aware when making a right turn can be changed in accordance with the aptitude of the driver.

Advantages of the Invention

According to the present invention, a driver can more reliably become aware, on a vehicle glass, of near-vehicle object information of which the driver should be aware.

EXPLANATION OF THE REFERENCE NUMERALS

1 Awareness Information Detecting Unit (Awareness Information Detecting Means)
1a Vehicle Exterior Camera
1b Image Processing Unit
1c Collision Judging Unit
2 Eye Position Detecting Unit (Eye Position Detecting Means)
2a Vehicle Interior Camera
2b Image Processing Unit
3 Display Device (Display Means)
3a Display Control Unit
3b Liquid Crystal Display Unit
3c Backlight Unit
3d Lens Unit
3e First Mirror Unit
3f Second Mirror Unit
3g Half Mirror Unit
3h Drive Device
3i Drive Device
4 Left/Right Turn Detecting Unit (Left/Right Turn Detecting Means)
5 Driver Information Setting Unit (Right Turn Required-Amount-of-Time Setting Means)
10 Vehicle Information Display System
11 Front Windshield
12 Side Window
13 Rear Windshield

BEST MODES FOR CARRYING OUT THE INVENTION

Figure 1:
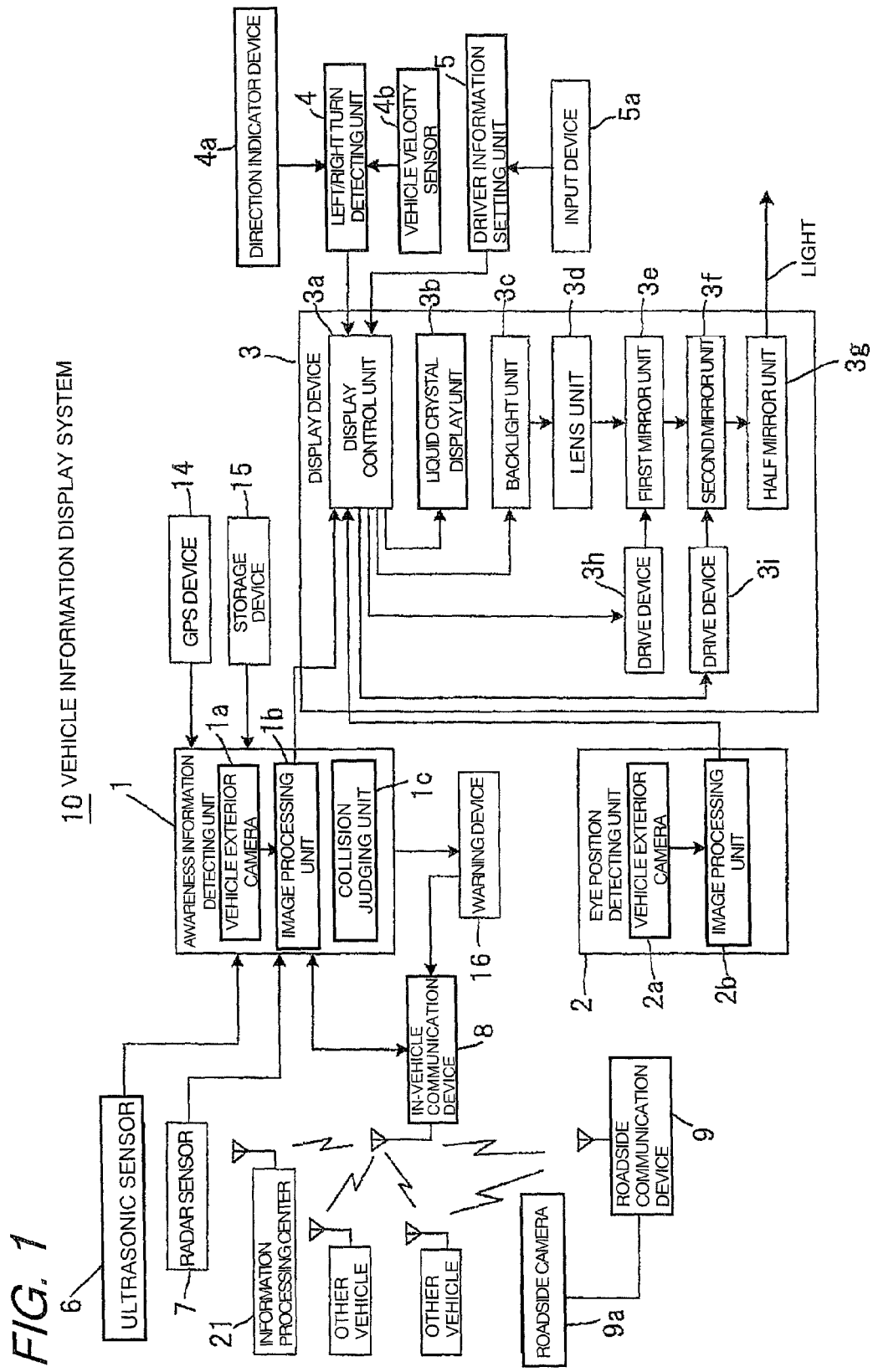
FIG. 1 is a block diagram showing an outline of a system configuration of a vehicle information display system pertaining to first to seventh embodiments of the present invention.

Best modes for carrying out the present invention will be described below with reference to the attached drawings. FIG. 1 is a block diagram showing an outline of a system configuration of a vehicle information display system pertaining to first to seventh embodiments of the present invention.

A vehicle information display system 10 pertaining to the first to seventh embodiments is equipped with an awareness information detecting unit 1 that detects information of an awareness object of which a driver should be aware near a host vehicle, an eye position detecting unit 2 that detects the position of the eyes of the driver, a display device 3 that displays the information of the awareness object on a front windshield 11 of the host vehicle, a left/right turn detecting unit 4 that detects a left turn waiting state or a right turn waiting state of the host vehicle, and a driver information setting unit 5 that sets driver information.

As the awareness object of which the driver should be aware, arbitrary objects to which the driver should pay close attention—such as, for example, four-wheeled motor vehicles traveling or parking on the road, two-wheeled motor vehicles, persons such as pedestrians, bicycles, traffic signs, road signs, and obstacles on the road—are included.

The awareness information detecting unit 1 has a vehicle exterior camera 1*a* that is capable of capturing an image of the vicinity of the host vehicle and an image processing unit 1*b* that performs well-known image processing with respect to the captured image that has been captured by the vehicle exterior camera 1*a*.

For the vehicle exterior camera 1*a* and a later-described vehicle interior camera 2*a*, for example, CCD cameras, C-MOS cameras or infrared cameras are used. Further, the vehicle exterior camera 1*a* is attached to a vehicle front portion or a vehicle roof portion, for example, and is capable of capturing an image of vehicles (four-wheeled motor vehicles, two-wheeled motor vehicles, etc.), bicycles, pedestrians and obstacles near the host vehicle.

The image processing unit 1*b* can perform predetermined image processing with respect to the captured image of a vehicle, pedestrian, etc. near the host vehicle that has been captured by the vehicle exterior camera 1*a* and detect various types of information about that vehicle, pedestrian, etc. For example, the image processing unit 1*b* can detect position information of the vehicle, pedestrian, etc. near the host vehicle (relative position with respect to the host vehicle, inter-vehicle distance, etc.), velocity information (absolute velocity of the object, relative velocity with respect to the host vehicle), and time of arrival until the object arrives at the host vehicle (inter-vehicle time).

More specifically, the image processing unit 1*b* can detect the distance (200 m) between the host vehicle and an oncoming vehicle, the velocity (60 km/h) of the oncoming vehicle, and the time of arrival (12 sec) until the oncoming vehicle arrives at the host vehicle.

The awareness information detecting unit 1 may also detect information of an awareness object near the host vehicle using an ultrasonic sensor 6 that is disposed in the host vehicle and emits ultrasonic waves into the vicinity of the host vehicle and detects objects or a radar sensor (millimeter wave radar sensor) 7 that is disposed in the host vehicle and emits radio waves into the vicinity of the host vehicle and detects objects. For example, the ultrasonic sensor 6 and the radar sensor 7 are capable of detecting the distance between a near-vehicle object and the host vehicle and the direction of this object.

Further, an in-vehicle communication device 8 capable of bidirectional information communication (so-called vehicle-to-vehicle communication) with other vehicles near the host vehicle may also be connected to the awareness information detecting unit 1.

The awareness information detecting unit 1 can perform vehicle-to-vehicle communication with another vehicle via the in-vehicle communication device 8 to acquire information of the other vehicle (vehicle type, traveling position information, traveling velocity information, acceleration information, traveling direction information, operation information (brake state, accelerator pedal state, steering state)) near the host vehicle.

For example, the awareness information detecting unit 1 can perform vehicle-to-vehicle communication via the in-vehicle communication device 8 to acquire information of the other vehicle (which is hidden by an obstacle or cannot be seen because it is far away) of which it is impossible or difficult for the vehicle exterior camera 1*a* to capture an image. On the other hand, the awareness information detecting unit 1 transmits information of the host vehicle to the other vehicle via the in-vehicle communication device 8. Thus, the other vehicle can acquire information of the host vehicle.

The awareness information detecting unit 1 performs vehicle-to-vehicle communication via the in-vehicle communication device 8 with other vehicles near the host vehicle, but it may also perform so-called vehicle-to-roadside communication via a roadside communication device 9 disposed on the roadside and the in-vehicle communication device 8.

For example, a roadside camera 9*a* that can capture an image of the road is attached to the roadside communication device 9. Consequently, the awareness information detecting unit 1 of the host vehicle can acquire, via the in-vehicle communication device 8 and the roadside communication device 9, image information that has been captured by the roadside camera 9*a* (image information of another vehicle etc. of which it is impossible or difficult for the vehicle exterior camera 1*a* of the host vehicle to capture an image).

The eye position detecting unit 2 has a vehicle interior camera 2*a* that is capable of capturing an image of the face of the driver and an image processing unit 2*b* that performs well-known image processing with respect to the captured image of the face of the driver that has been captured by the vehicle interior camera 2*a*.

Figure 2:
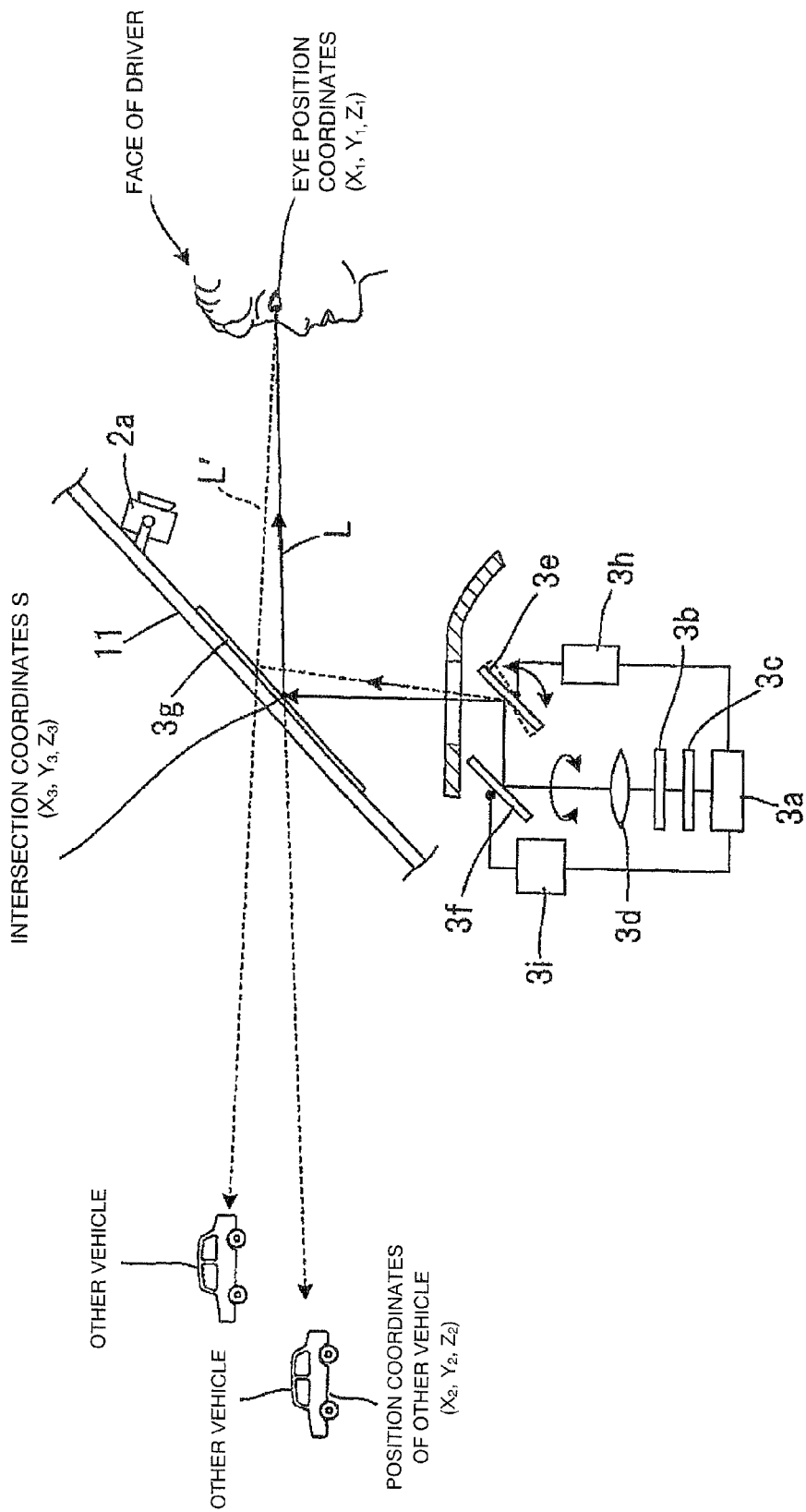
FIG. 2 is a diagram showing one example of a basic configuration of a display device pertaining to the vehicle information display system.

The vehicle interior camera (driver monitor) 2*a* is attached to a portion above the front windshield 11 on the driver seat side inside a vehicle cabin, for example, and can capture an image of the face of the driver (FIG. 2).

The image processing unit 2*b* performs well-known image processing (pattern matching, etc.) with respect to the captured image of the face of the driver that has been captured by the vehicle interior camera 2*a*. Additionally, the image processing unit 2*b* can recognize the position of the eyes of the driver, for example, in a 3-dimensional coordinate system of the vehicle (e.g., a 3-dimensional coordinate system $(X_1, Y_1, Z_1)$ whose origins (0, 0, 0) are the attachment position of the vehicle interior camera 2*a*).

Figure 3:
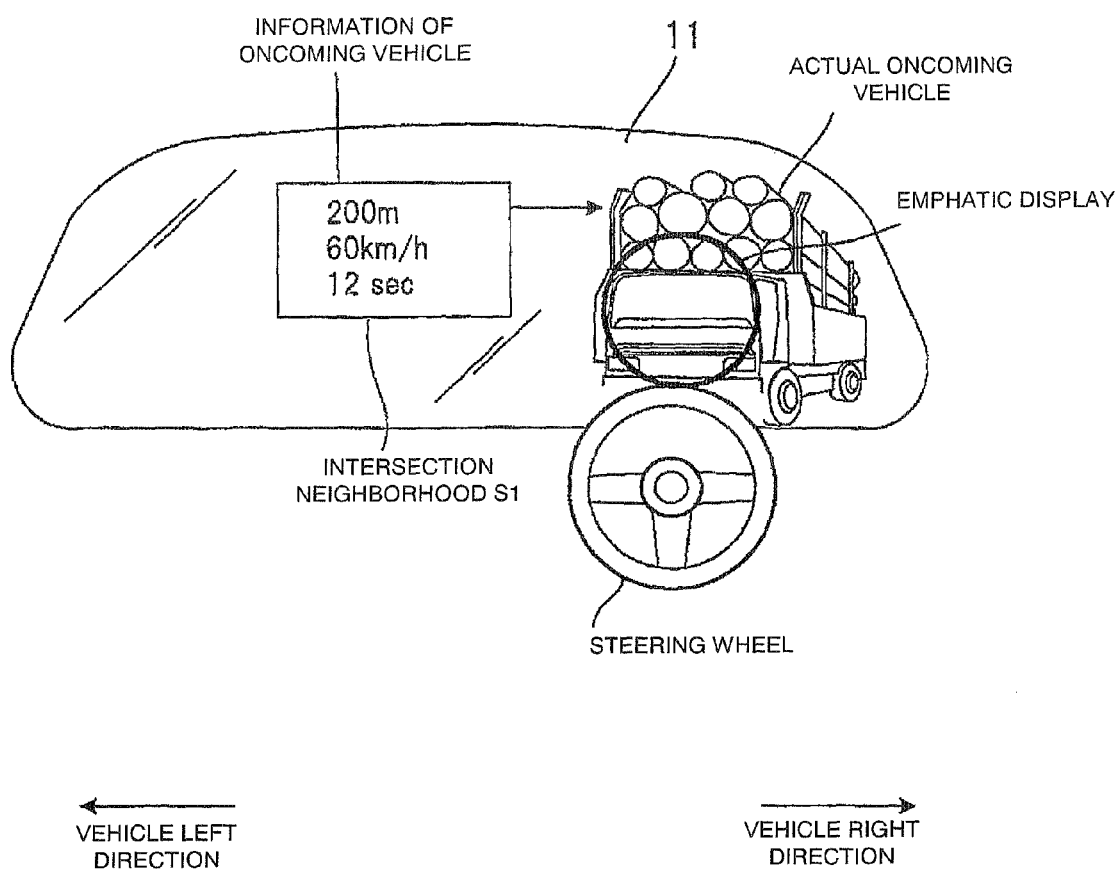
FIG. 3 is a view seen from a driver side showing one example of display on a front windshield resulting from the display device of the vehicle information display system pertaining to the first embodiment.

The display device 3 displays on the front windshield 11 the various types of information that have been detected by the image processing unit 1*b* of the awareness information detecting unit 1. For example, the display device 3 displays on the front windshield 11 the distance between the host vehicle and an oncoming vehicle (200 m), the velocity (60 km/h) of the oncoming vehicle, and the estimated time of arrival (12 sec) until the oncoming vehicle arrives at the host vehicle, which have been detected by the image processing unit 1*b* of the awareness information detecting unit 1 (FIG. 3).

For the display device 3, for example, a head-up display device (Head Up Display) is used. The head-up display device has, as its main configuration, a display control unit 3*a*, a liquid crystal display unit 3*b*, a backlight unit 3*c*, a lens unit 3*d*, first and second mirror units 3*e* and 3*f*, a half mirror unit 3*g* and drive devices 3*h* and 3*i* (FIG. 2).

The display control unit 3*a* performs display control of an image displayed on the liquid crystal display unit 3*b*. For example, the display control unit 3*a* performs display control of the shape, position, color, etc. of an image displayed on the liquid crystal display unit 3*b*. The main hardware configuration of the display control unit 3*a* is configured from a CPU (Central Processing Unit) that performs arithmetic processing, control processing, etc., a ROM (Read Only Memory) in which a control program, etc. are stored, and a RAM (Random Access Memory) that temporarily stores data. The CPU, the ROM and the RAM are interconnected via a data bus, for example, and perform bidirectional data communication.

The display control unit 3a, the liquid crystal display unit 3b, the backlight unit 3c, the lens unit 3d, the first and second mirror units 3e and 3f and the drive units 3h and 3i are respectively disposed in a dashboard in the vehicle cabin, for example. The half mirror unit 3g is attached to the inner side of the front windshield 11.

Two-dimensional image light displayed on the liquid crystal display unit 3b is transmitted through the lens unit 3d and is reflected by the first and second mirror units 3e and 3f. Additionally, the light reflected by the first and second mirror units 3e and 3f is reflected by the half mirror unit 3g and reaches the eyes of the driver. On the other hand, light from the front of the vehicle is transmitted through the front windshield 11 and the half mirror unit 3g and reaches the eyes of the driver.

Further, the first mirror unit 3e is pivotally supported such that it may freely swing about a horizontal shaft, and the second mirror unit 3f is pivotally supported such that it may freely swing about a vertical shaft. The first and second mirror units 3e and 3f are respectively driven by the drive devices 3h and 3i such as servo motors and swing.

The display control unit 3a can, by driving and controlling the drive devices 3h and 3i, control the swinging of the first and second mirror units 3e and 3f and control the display position of an image on the front windshield 11.

The display control unit 3a can, by controlling the swinging of the first mirror unit 3e, move the display position of an image on the front windshield 11 in the up-down direction (e.g., move a position on an axis L to a position on an axis L'). Further, the display control unit 3a can also, by controlling the swinging of the second mirror unit 3f, move the display position of an image on the front windshield 11 in the left-right direction.

For example, the display control unit 3a can display, at intersection coordinates S ($X_3, Y_3, Z_3$) where an axis L interconnecting position coordinates ($X_1, Y_1, Z_1$) of the eyes of the driver that have been detected by the image processing unit 2b of the eye position detecting unit 2 and position coordinates ($X_2, Y_2, Z_2$) of another vehicle (an oncoming vehicle) intersects the front windshield 11 or in coordinates S1 ($X_3+\Delta_1, Y_3+\Delta_2, Z_3+\Delta_3$) in a neighborhood of that intersection, information of that other vehicle (distance to the other vehicle, velocity information, estimated time of arrival, etc.) or an emphatic display.

Here, it will be assumed that the position coordinates ($X_2, Y_2, Z_2$) of the other vehicle are recognized in the 3-dimensional coordinate system of the vehicle by the image processing unit 1b of the awareness information detecting unit 1 and that position coordinates ($X_4, Y_4, Z_4$) of the front windshield 11 are set beforehand in the 3-dimensional coordinate system. Further, it will be assumed that arbitrary values are set depending on the display position for the values of $\Delta_1, \Delta_2$ and $\Delta_3$, which are offset amounts of the intersection S.

The display control unit 3a calculates the intersection coordinates S ($X_3, Y_3, Z_3$) or the coordinates ($X_3+\Delta_1, Y_3+\Delta_2, Z_3+\Delta_3$) in the neighborhood of that intersection on the basis of the position coordinates ($X_1, Y_1, Z_1$) of the eyes of the driver, the position coordinates ($X_2, Y_2, Z_2$) of the other vehicle and the position coordinates ($X_4, Y_4, Z_4$) of the front windshield 11. The method of calculating each of the position coordinates is a well-known technique, so detailed description will be omitted.

Further, the emphatic display of the other vehicle may, for example, be achieved by displaying a color border (a conspicuous color border such as a substantially circular, substantially rectangular or substantially triangular red color border or yellow color border) that surrounds the other vehicle or by causing the display to blink in a predetermined cycle (e.g., about 0.5 second). That is, arbitrary display methods by which the awareness object of which the driver should be aware is emphasized and which makes the awareness object conspicuous are included.

The left/right turn detecting unit 4 detects a left turn waiting state or a right turn waiting state of the host vehicle on the basis of an output signal from a direction indicator device (blinker device) 4a of the vehicle and a vehicle velocity that has been detected by a vehicle velocity sensor 4b. The direction indicator device 4a outputs a right direction signal when its switch is placed in an ON state in the right direction. On the other hand, the direction indicator device 4a outputs a left direction signal when its switch is placed in an ON state in the left direction.

For example, the left/right turn detecting unit 4 detects the right turn waiting state of the host vehicle when it receives the right direction signal from the direction indicator device 4a and detects that the vehicle velocity is 0 (stopped state) from the vehicle velocity sensor 4b. Similarly, the left/right turn detecting unit 4 detects the left turn waiting state of the host vehicle when it receives the left direction signal from the direction indicator 4a and detects that the vehicle velocity is 0 from the vehicle velocity sensor 4b.

The driver information setting unit (right turn required-amount-of-time setting unit) 5 is capable of setting various types of information of the driver (right turn, left turn, required amount of time to park, etc., age, sex, physical characteristics, physical capability) and, for example, sets a right turn required-amount-of-time T that is required for the driver to turn the host vehicle right.

Further, the driver can perform input operations with respect to an input device (touch panel, input switch) 5a of the vehicle and the driver information setting unit 5 can recognize the input information (numerical information) that has been inputted to the input device 5a. More specifically, the right turn required-amount-of-time T (e.g., about 4 to 8 seconds) that is required for the driver to turn the host vehicle right is inputted to the input device 5a, and the driver information setting unit 5 recognizes and sets, as the right turn required-amount-of-time T, the input value that has been inputted to the input device 5a.

The driver information setting unit 5 may also automatically acquire and set the information of the driver (information of a driver whose ID is registered in a vehicle key) from an outside information processing center (a database facility in which various types of information are stored) 21 via the in-vehicle communication device 8.

Display control methods resulting from the vehicle information display system 10 configured as described above will be described in detail below. The basic hardware configurations in the vehicle information display system 10 pertaining to the first to seventh embodiments are substantially the same. Consequently, in the vehicle information display system 10 pertaining to the first to seventh embodiments, the same reference numerals will be given to portions that are substantially the same and detailed description will be omitted.

(First Embodiment)

Figure 4:
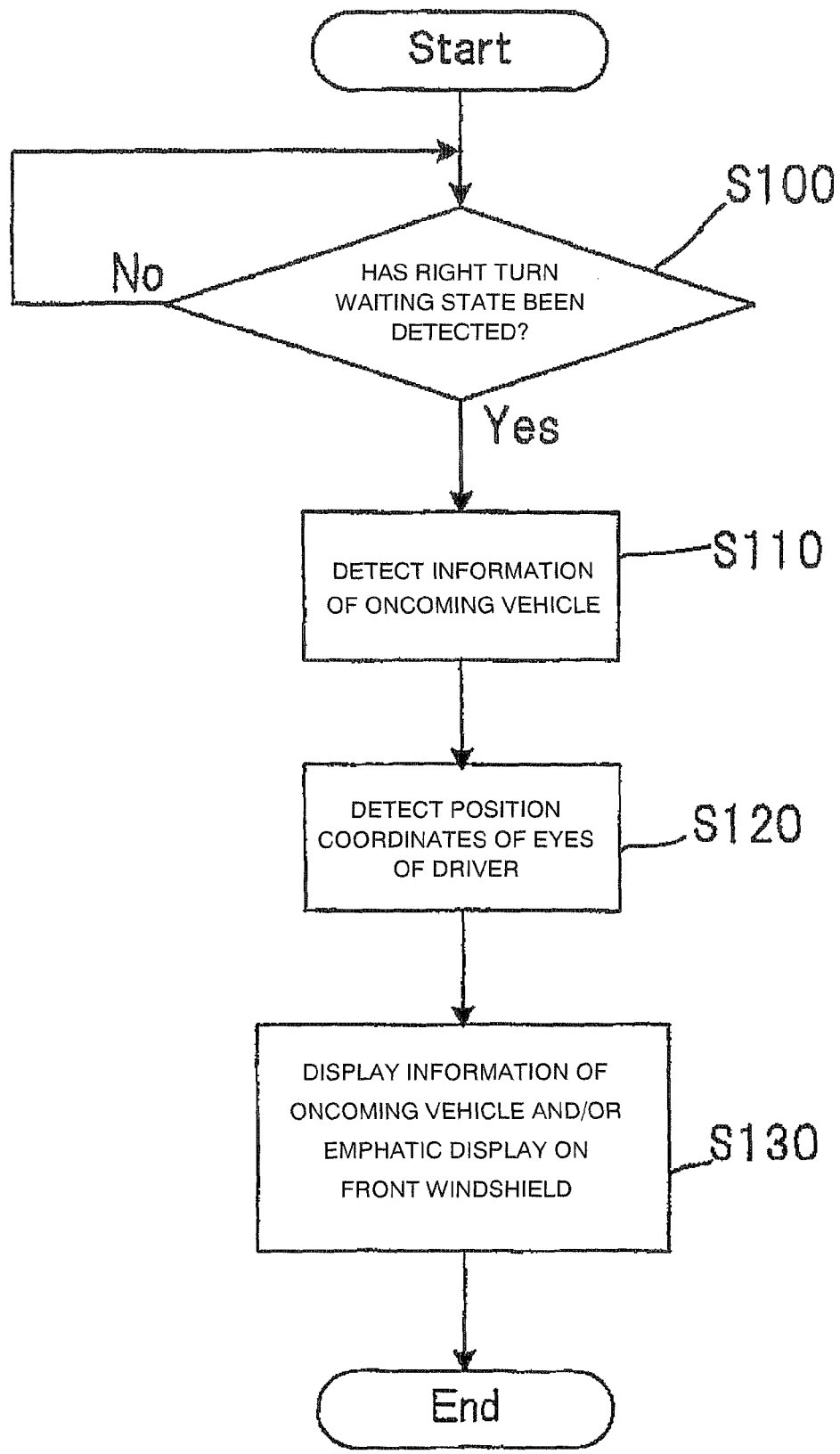
FIG. 4 is a flowchart showing one example of a control processing flow of the vehicle information display system pertaining to the first embodiment.

FIG. 4 is a flowchart showing one example of a control processing flow of the vehicle information display system 10 pertaining to the first embodiment. The control processing flows shown in FIG. 4 to FIG. 6 and FIG. 8 are repeatedly executed every predetermined amount of time (e.g., 50 sec).

In the vehicle information display system 10 pertaining to the first embodiment, the left/right turn detecting unit 4 detects the right turn waiting state of the host vehicle when it receives the right direction signal from the direction indicator device 4a and detects that the vehicle velocity is 0 from the vehicle velocity sensor 4b (S100).

When the right turn waiting state of the host vehicle is detected by the left/right turn detecting unit 4 (Yes in S100), the image processing unit 1b of the awareness information detecting unit 1 performs predetermined image processing with respect to a captured image of an oncoming vehicle that has been captured by the vehicle exterior camera 1a. Then, the image processing unit 1b detects information of the oncoming vehicle (type information (ordinary automobile, compact automobile, large automobile, two-wheeled motor vehicle), velocity information, position information (position coordinates with respect to the host vehicle, distance from the host vehicle) and estimated time of arrival of the oncoming vehicle) (S110). On the other hand, when the right turn waiting state of the host vehicle is not detected by the left/right turn detecting unit 4 (No in S100), the processing of (S100) is continued.

The vehicle interior camera 2a of the eye position detecting unit 2 captures an image of the face of the driver, and the image processing unit 2b performs predetermined image processing with respect to the image of the face of the driver that has been captured by the vehicle interior camera 2a. Then, the image processing unit 2b detects the position coordinates ($X_1$, $Y_1$, $Z_1$) of the eyes of the driver in the 3-dimensional coordinate system of the vehicle (S120).

The display control unit 3a of the display device 3 displays, in the intersection S where the axis L interconnecting the position coordinates ($X_1$, $Y_1$, $Z_1$) of the eyes that have been detected by the image processing unit 2b of the eye position detecting unit 2 and the position coordinates ($X_2$, $Y_2$, $Z_2$) of the oncoming vehicle that have been detected by the image processing unit 1b of the awareness information detecting unit 1 intersects the front windshield 11 of the vehicle (hereinafter called "the intersection S on the front windshield 11") or in the intersection neighborhood S1 (hereinafter called "the intersection neighborhood S1 on the front windshield 11"), the information of the oncoming vehicle and/or the emphatic display of the oncoming vehicle (S130), as shown in FIG. 3.

Here, the intersection neighborhood S1 is, for example, a position on the side of the intersection S offset by a predetermined amount (e.g., about 15 cm in the vehicle width direction) from the intersection S on the front windshield 11 and is a position that does not obstruct the field of view of the driver. This offset amount is an amount where, for example, when the driver moves his/her point of view from the intersection S to the intersection neighborhood S1, that point of view movement can be done naturally.

Further, as the information of the oncoming vehicle, for example, the distance between the oncoming vehicle and the host vehicle, the velocity of the oncoming vehicle and the estimated time of arrival until the oncoming vehicle arrives at the host vehicle are included. Further, as the emphatic display of the oncoming vehicle, for example, the display control unit 3a of the display device 3 performs display that surrounds the oncoming vehicle in a color border (a substantially circular red color border or yellow color border, etc.).

As described above, in the vehicle information display system 10 pertaining to the first embodiment, the display control unit 3a of the display device 3 displays, in the intersection S where the axis L interconnecting the position coordinates ($X_1$, $Y_1$, $Z_1$) of the eyes of the driver that have been detected by the image processing unit 2b of the eye position detecting unit 2 and the position coordinates ($X_2$, $Y_2$, $Z_2$) of the oncoming vehicle that have been detected by the image processing unit 1b of the awareness information detecting unit 1 intersects the front windshield 11 or in the intersection neighborhood S1, the information of the oncoming vehicle and/or the emphatic display. Thus, even if the driver were not to direct his/her line of sight, information of a near-vehicle oncoming vehicle of which the driver should be aware is automatically displayed on the front windshield 11, so the driver can naturally become aware of the information of this oncoming vehicle. That is, the driver can more reliably become aware, on the front windshield 11, of near-vehicle object information of which the driver should be aware.

For example, even when the driver fails to see an oncoming vehicle when the driver makes a right turn, information of that oncoming vehicle is automatically displayed on the front windshield 11. Thus, the driver can naturally become aware of the information of that oncoming vehicle.

(Second Embodiment)

Figure 5:
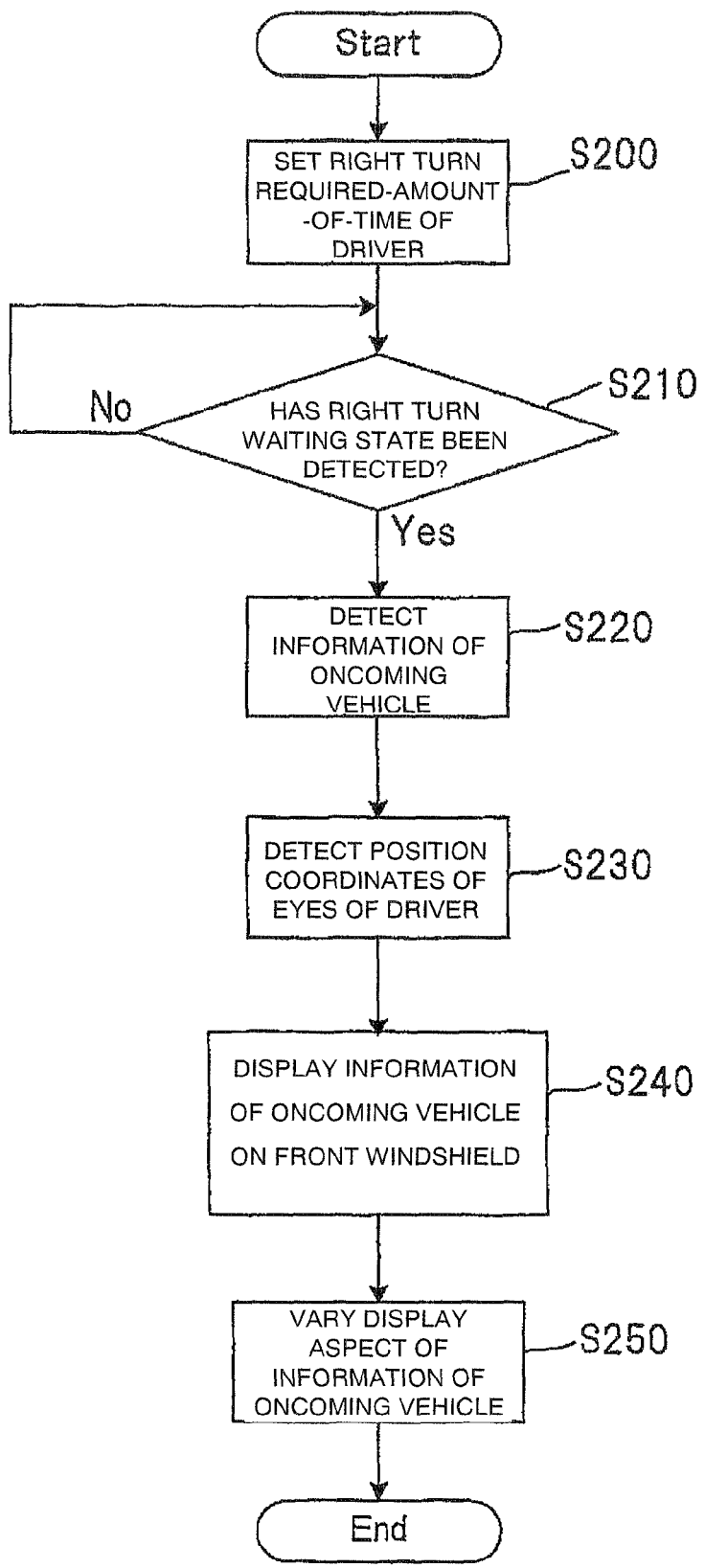
FIG. 5 is a flowchart showing one example of a control processing flow of the vehicle information display system pertaining to the second embodiment.

FIG. 5 is a flowchart showing one example of a control processing flow of the vehicle information display system 10 pertaining to the second embodiment.

In the vehicle information display system 10 pertaining to the second embodiment, the driver information setting unit 5 sets the right turn required-amount-of-time T of the driver that has been inputted via the input device 5a (S200).

The left/right turn detecting unit 4 detects the right turn waiting state of the host vehicle when it receives the right direction signal from the direction indicator device 4a and detects that the vehicle velocity is 0 from the vehicle velocity sensor 4b (S210).

When the right turn waiting state of the host vehicle is detected by the left/right turn detecting unit 4 (Yes in S210), the image processing unit 1b of the awareness information detecting unit 1 performs predetermined image processing with respect to a captured image of an oncoming vehicle that has been captured by the vehicle exterior camera 1a. Then, the image processing unit 1b detects information of the oncoming vehicle (S220). On the other hand, when the right turn waiting state of the host vehicle is not detected by the left/right turn detecting unit 4 (No in S210), the processing of (S210) is continued.

The image processing unit 2b of the eye position detecting unit 2 performs predetermined image processing with respect to the image of the face of the driver that has been captured by the vehicle interior camera 2a and detects the position coordinates ($X_1$, $Y_1$, $Z_1$) of the eyes of the driver (S230).

Next, as shown in FIG. 3, the display control unit 3a of the display device 3 displays the information of the oncoming vehicle in the intersection neighborhood S1 on the front windshield 11 (S240).

After that, the display control unit 3a varies the display aspect of the information of the oncoming vehicle on the basis of the right turn required-amount-of-time T of the driver that has been set in the driver information setting unit 5 (S250). The processing of (S240) and (S250) may also be performed at the same time.

As the display aspect of the information of the oncoming vehicle, for example, when the right turn required-amount-of-time T of the driver that has been set is short (equal to or less than about 4 seconds), the information of the oncoming vehicle may be displayed in a blue color. Further, when the right turn required-amount-of-time T of the driver that has been set is ordinary (about 4 to 8 seconds), the information of the oncoming vehicle may be displayed in a yellow color. Moreover, when the right turn required-amount-of-time T of the driver that has been set is long (equal to or greater than 8 seconds), the information of the oncoming vehicle may be displayed in a red color.

The time settings and the display colors of the standards described above may also be configured such that they can be arbitrarily changed by the driver via the input device 5a.

As described above, in the vehicle information display system 10 pertaining to the second embodiment, the display control unit 3a of the display device 3 displays the information of the oncoming vehicle in the intersection neighborhood S1 on the front windshield 11. Additionally, the display control unit 3a varies the display aspect of the oncoming vehicle on the basis of the right turn required-amount-of-time T of the driver that has been set in the driver information setting unit 5. Thus, the method of displaying information of an oncoming vehicle of which the driver should be aware when making a right turn can be changed in accordance with the capability of the driver (characteristics of the driver such as skill and experience) when the driver turns the host vehicle right. Consequently, information of an oncoming vehicle of which the driver should be aware when making a right turn is displayed in a more optimum state in accordance with the aptitude of the driver, so the driver can more reliably become aware of the information of the oncoming vehicle. That is, the driver can more reliably become aware, on the front windshield 11, of near-vehicle object information of which the driver should be aware.

(Third Embodiment)

Figure 6:
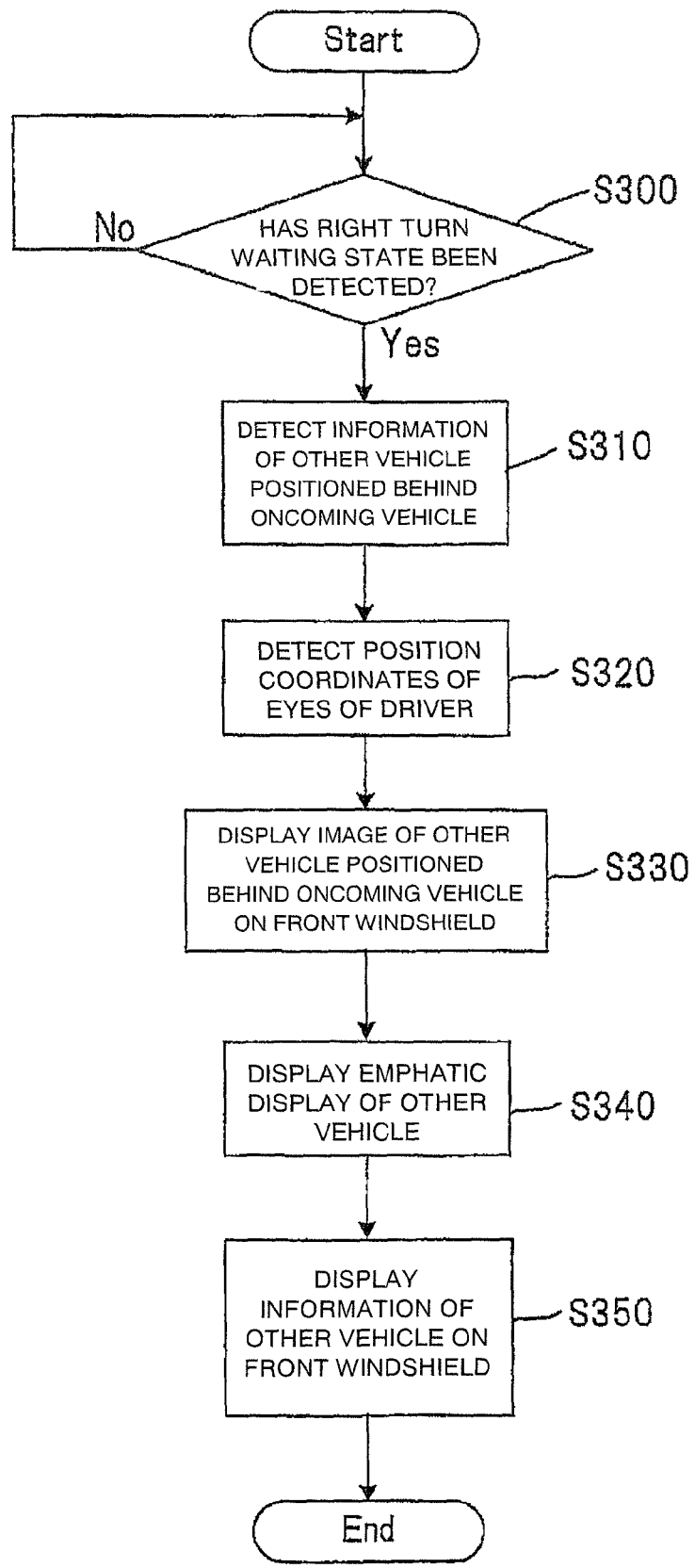
FIG. 6 is a flowchart showing one example of a control processing flow of the vehicle information display system pertaining to the third embodiment.

FIG. 6 is a flowchart showing one example of a control processing flow of the vehicle information display system 10 pertaining to the third embodiment.

In the vehicle information display system 10 pertaining to the third embodiment, the left/right turn detecting unit 4 detects the right turn waiting state of the host vehicle when it receives the right direction signal from the direction indicator device 4a and detects that the vehicle velocity is 0 from the vehicle velocity sensor 4b (S300).

When the right turn waiting state of the host vehicle is detected by the left/right turn detecting unit 4 (Yes in S300), the awareness information detecting unit 1 performs vehicle-to-vehicle communication and/or vehicle-to-roadside communication via the in-vehicle communication device 8 and detects information of another vehicle that is positioned behind an oncoming vehicle (S310).

Here, as the information of the other vehicle, for example, the type (two-wheeled motor vehicle) of the other vehicle, the velocity (60 km/h), the vehicle state (accelerating state, decelerating state, forwardly traveling state, right turning state, left turning state) and an image of the other vehicle are included. Further, the other vehicle that is positioned behind the oncoming vehicle is, for example, another vehicle that is impossible or difficult for the driver of the host vehicle to see because the other vehicle is positioned behind the oncoming vehicle. More specifically, the other vehicle that is positioned behind the oncoming vehicle is a two-wheeled motor vehicle, a four-wheeled motor vehicle or the like that follows behind the oncoming vehicle and has the potential to overtake this oncoming vehicle from the side.

On the other hand, when the right turn waiting state of the host vehicle is not detected by the left/right turn detecting unit 4 (No in S300), the processing of (S300) is continued.

The vehicle interior camera 2a of the eye position detecting unit 2 captures an image of the face of the driver, and the image processing unit 2b performs predetermined image processing with respect to the image of the face of the driver that has been captured by the vehicle interior camera 2a. Then, the image processing unit 2b detects the position coordinates ($X_1$, $Y_1$, $Z_1$) of the eyes of the driver in the 3-dimensional coordinate system of the vehicle (S320).

Figure 7:
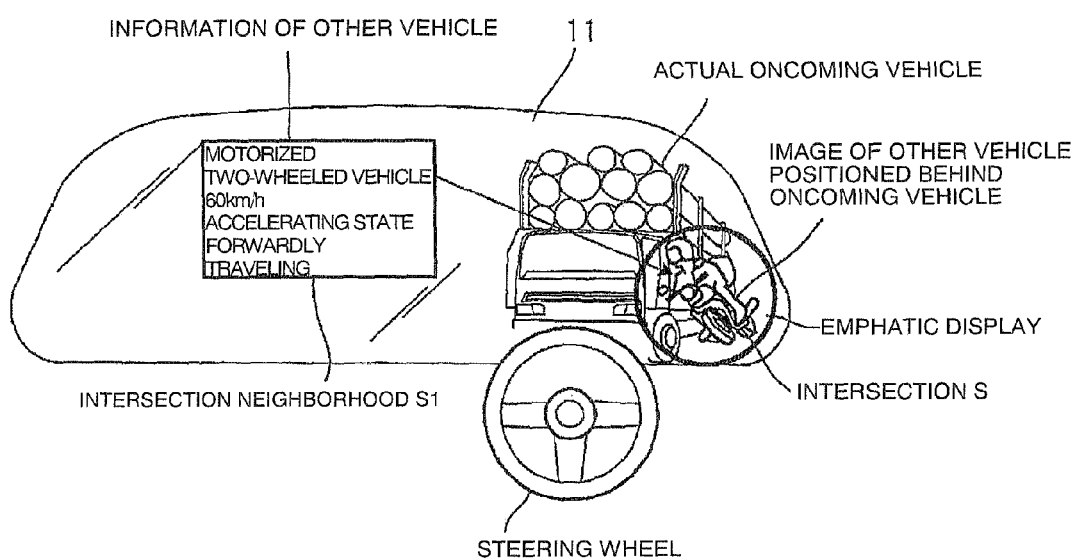
FIG. 7 is a view seen from the driver side showing one example of display on the front windshield resulting from the display device of the vehicle information display system pertaining to the third embodiment.

As shown in FIG. 7, the display control unit 3a of the display device 3 displays an image of the other vehicle (motorized two-wheeled vehicle) that is positioned behind the oncoming vehicle in the intersection S on the front windshield 11 (S330) and displays an emphatic display (a substantially circular red color border surrounding display) of that other vehicle (S340). Moreover, the display control unit 3a displays the information of the other vehicle (motorized two-wheeled vehicle, 60 km/h, accelerating state, forwardly traveling state) in the intersection neighborhood S1 on the front windshield 11 (S350).

As described above, in the vehicle information display system 10 pertaining to the third embodiment, when the right turn waiting state of the host vehicle has been detected by the left/right turn detecting unit 4, the display control unit 3a of the display device 3 displays the information of the other vehicle that is positioned behind the oncoming vehicle and/or the emphatic display in the intersection S or the intersection neighborhood S1 on the front windshield 11. Thus, the driver can reliably become aware of information of another vehicle of which the driver should be aware when making a right turn and which is normally hidden by an oncoming vehicle and of which is impossible or difficult for the driver to be aware. That is, the driver can more reliably become aware, on the front windshield 11, of near-vehicle object information of which the driver should be aware.

(Fourth Embodiment)

The vehicle information display system 10 pertaining to the first to third embodiments is configured such that various types of information are displayed on the front windshield 11, but the vehicle information display system 10 pertaining to the fourth embodiment is different in that it is configured such that the various types of information described above are displayed on a side window 12 of the host vehicle.

Figure 8:
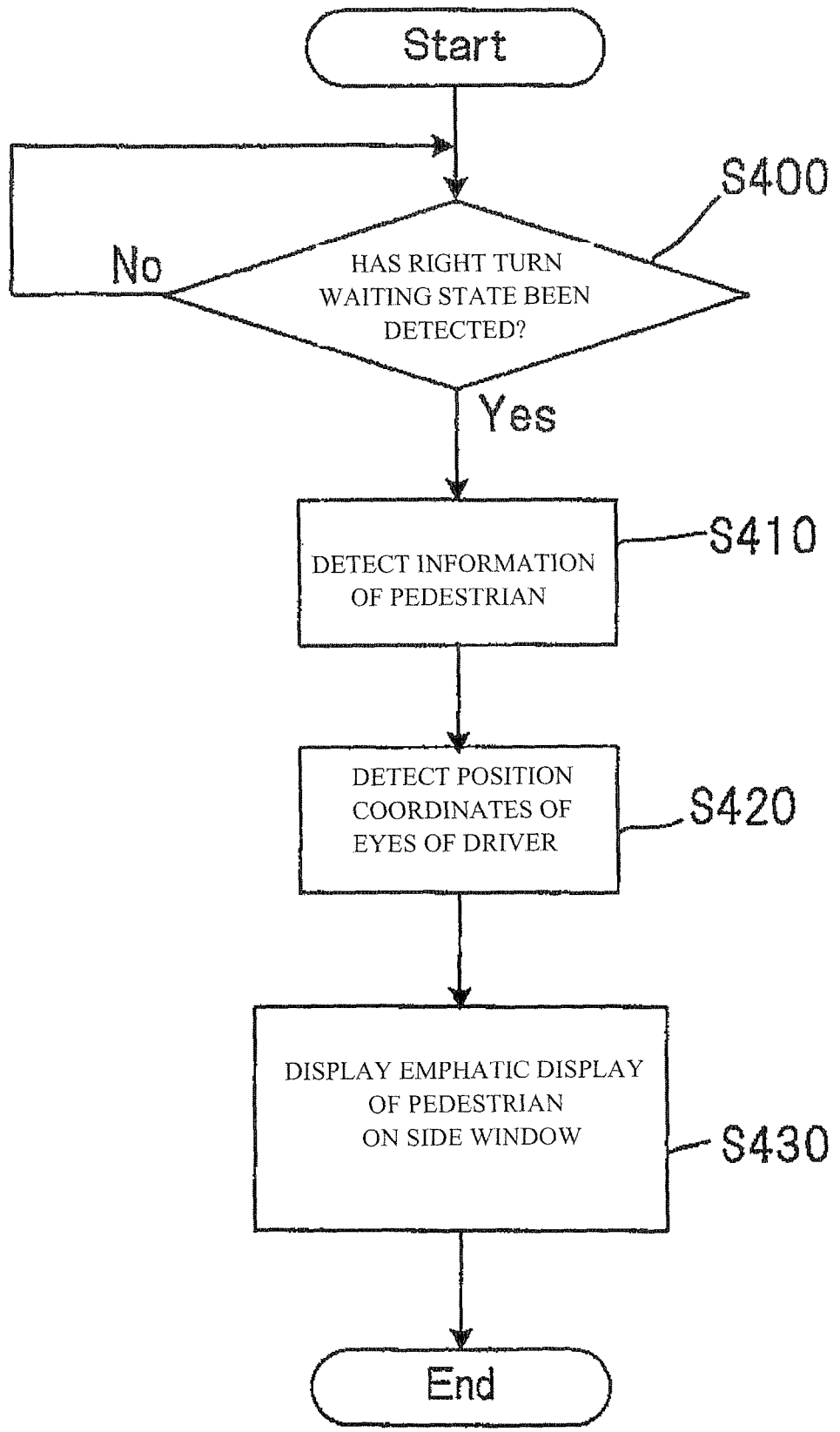
FIG. 8 is a flowchart showing one example of a control processing flow of the vehicle information display system pertaining to the fourth embodiment.

FIG. 8 is a flowchart showing one example of a control processing flow of the vehicle information display device 10 pertaining to the fourth embodiment of the invention.

In the vehicle information display system 10 pertaining to the fourth embodiment, the left/right turn detecting unit 4 detects the right turn waiting state of the host vehicle when it receives the right direction signal from the direction indicator device 4a and detects that the vehicle velocity is 0 from the vehicle velocity sensor 4b (S400).

When the right turn waiting state of the host vehicle is detected by the left/right turn detecting unit 4 (Yes in S400), the image processing unit 1b of the awareness information detecting unit 1 performs predetermined image processing with respect to a captured image of a path of travel or a neighborhood thereof (a crosswalk that crosses the path of travel, etc.) when making a right turn that has been captured by the vehicle exterior camera 1a. Then, the image processing unit 1b detects information of a pedestrian who is present on or near the path of travel (S410). Here, as the information of the pedestrian, arbitrary information relating to the pedestrian—such as, for example, the age, sex, physical state, number and state of motion (traveling direction, traveling velocity) of the pedestrian—is included.

The awareness information detecting unit 1 may also perform vehicle-to-roadside communication via the in-vehicle communication device 8 and perform image processing with respect to a captured image of a path of travel or a neighborhood thereof (a crosswalk that crosses the path of travel, etc.) when making a right turn that has been captured by the roadside camera 9a of the roadside communication device 9.

On the other hand, when the right turn waiting state of the host vehicle is not detected by the left/right turn detecting unit 4 (No in S400), the processing of (S400) is continued.

The image processing unit 2b of the eye position detecting unit 2 performs predetermined image processing with respect to the image of the face of the driver that has been captured by the vehicle interior camera 2a and detects the position coordinates $(X_1, Y_1, Z_1)$ of the eyes of the driver (S420).

Figure 9:
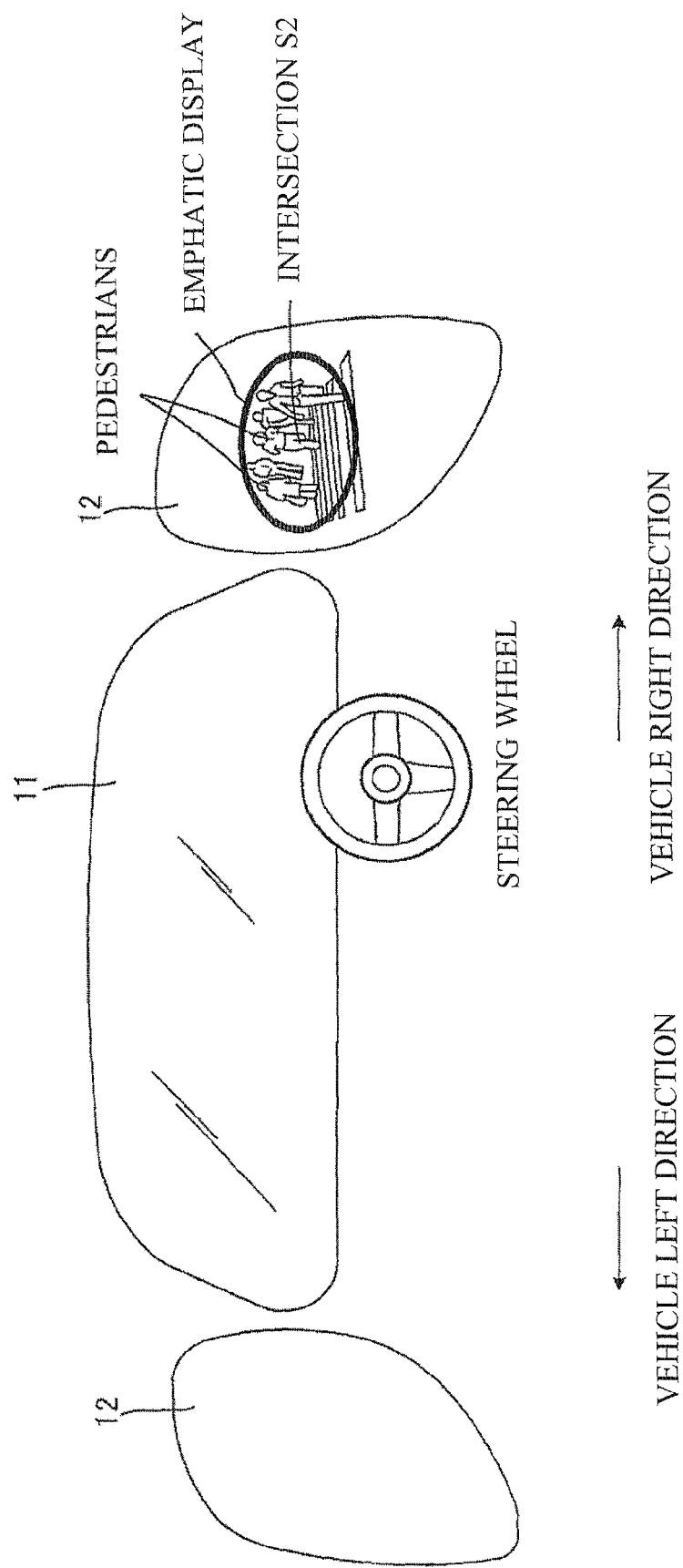
FIG. 9 is a view seen from the driver side showing one example of display on a side window resulting from the display device of the vehicle information display system pertaining to the fourth embodiment.

As shown in FIG. 9, the display control unit 3a of the display device 3 displays, in an intersection S2 where an axis that interconnects the position coordinates $(X_1, Y_1, Z_1)$ of the eyes that have been detected by the image processing unit 2b of the eye position detecting unit 2 and position coordinates of the pedestrian that have been detected by the image processing unit 1b of the awareness information detecting unit 1 intersects the side window 12 on the vehicle right side (hereinafter called "the intersection S2 on the side window 12"), an emphatic display of the pedestrian (a substantially circular red border surrounding display) (S430).

Here, when several pedestrians are present, the display control unit 3a may also be configured to surround all or a majority of the pedestrians with the surrounding display. At the same time, the display control unit 3a may also be configured to display the information of the pedestrians in a neighborhood S3 of the intersection on the side window 12.

As described above, in the vehicle information display system 10 pertaining to the fourth embodiment, when the right turn waiting state of the host vehicle has been detected by the left/right turn detecting unit 4, the image processing unit 1b of the awareness information detecting unit 1 detects information of a pedestrian who is present on or near a path of travel when the host vehicle makes a right turn. Additionally, the display control unit 3a of the display device 3 displays an emphatic display of that pedestrian in the intersection S2 on the side window 12 on the right side. Thus, the driver can more reliably become aware of information of a pedestrian of which the driver should be aware when making a right turn. That is, the driver can more reliably become aware, on the side window 12, of near-vehicle object information of which the driver should be aware.

Next, a modification of the vehicle information display system 10 pertaining to the present embodiment will be described.

In the fourth embodiment described above, the display control unit 3a of the display device 3 may also be configured such that even when a pedestrian who is present on or near the path of travel has been detected by the image processing unit 1b of the awareness information detecting unit 1, when the moving velocity of that pedestrian is equal to or greater than a predetermined velocity (e.g., about 8 km/h), the display control unit 3a of the display device 3 does not display information of that pedestrian on the side window 12. Thus, only information of a pedestrian of which the driver should be aware can be precisely displayed.

Further, in the fourth embodiment described above, the display control unit 3a of the display device 3 displays the emphatic display of the pedestrian on the side window 12, but it may also appropriately display the emphatic display of the pedestrian on the front windshield 11.

(Fifth Embodiment)

The vehicle information display system 10 pertaining to the fifth embodiment is, like the vehicle information display system 10 pertaining to the fourth embodiment, configured such that the various types of information described above are displayed on the side window 12 of the host vehicle.

In the vehicle information display system 10 pertaining to the fifth embodiment, the awareness information detecting unit 1 performs vehicle-to-roadside communication or vehicle-to-vehicle communication via the roadside communication device 9 and the in-vehicle communication device 8 to acquire information of an invisible object, such as a pedestrian, that is hidden in the shadow of an obstacle such as a wall or a building near the host vehicle and which the driver cannot see. Here, for example, an image of a pedestrian who is hidden by an obstacle such as the wall or building described above or by another vehicle and whom the driver cannot see is captured by the roadside camera 9a of the roadside communication device 9 or a vehicle exterior camera of another vehicle.

Then, the display control unit 3a of the display device 3 displays the acquired information of the invisible object (e.g., an image of an actual pedestrian) on the intersection S2 on the side window 12. The display control unit 3a may also at the same time display an emphatic display (a substantially circular red border surrounding display) that emphasizes this image of the pedestrian.

As described above, in the vehicle information display system 10 pertaining to the fifth embodiment, the awareness information detecting unit 1 performs vehicle-to-roadside communication and/or vehicle-to-vehicle communication via the roadside communication device 9 and the in-vehicle communication device 8 to acquire information of an invisible object that is hidden behind an obstacle near the host vehicle and which the driver cannot see. Additionally, the display control unit 3a of the display device 3 displays the acquired information of the invisible object on the intersection S2 on the side window 12. Thus, the driver can reliably become aware of information of an invisible object of which the driver should be aware but which is hidden behind an obstacle and which the driver cannot inherently see. That is, the driver can more reliably become aware, on the side window 12, of near-vehicle object information of which the driver should be aware.

(Sixth Embodiment)

In the vehicle information display system 10 pertaining to the sixth embodiment, the image processing unit 1b of the awareness information detecting unit 1 detects traffic regulation information of a road on which the host vehicle travels on the basis of an image of a road sign that has been captured by the vehicle exterior camera 1a of the awareness information detecting unit 1.

The traffic regulation information is information that regulates traffic on the road on which the host vehicle is currently traveling; for example, arbitrary regulation information that regulates traffic—such as do not pass, no through road, speed limits, height limits, through time regulations, and no parking—is included.

Further, the awareness information detecting unit 1 may also perform vehicle-to-roadside communication or vehicle-to-vehicle communication via the roadside communication device 9 and/or the in-vehicle communication device 8 to detect the traffic regulation information of the road on which the host vehicle travels. Moreover, the awareness information detecting unit 1 may also detect the traffic regulation information of the road on which the host vehicle travels on the basis of current position information of the host vehicle acquired by a GPS (Global Positioning System) device 14 installed in the host vehicle and map information stored beforehand in a storage device 15 (a hard disk device, etc.).

Here, in the map information, arbitrary information included in a map—such as, for example, road information, traffic regulation information of that road, and facility information—is included. Further, the GPS device 14 and the storage device 15 may also have a configuration where they are built into a navigation device that guides the vehicle to a destination.

Figure 10:
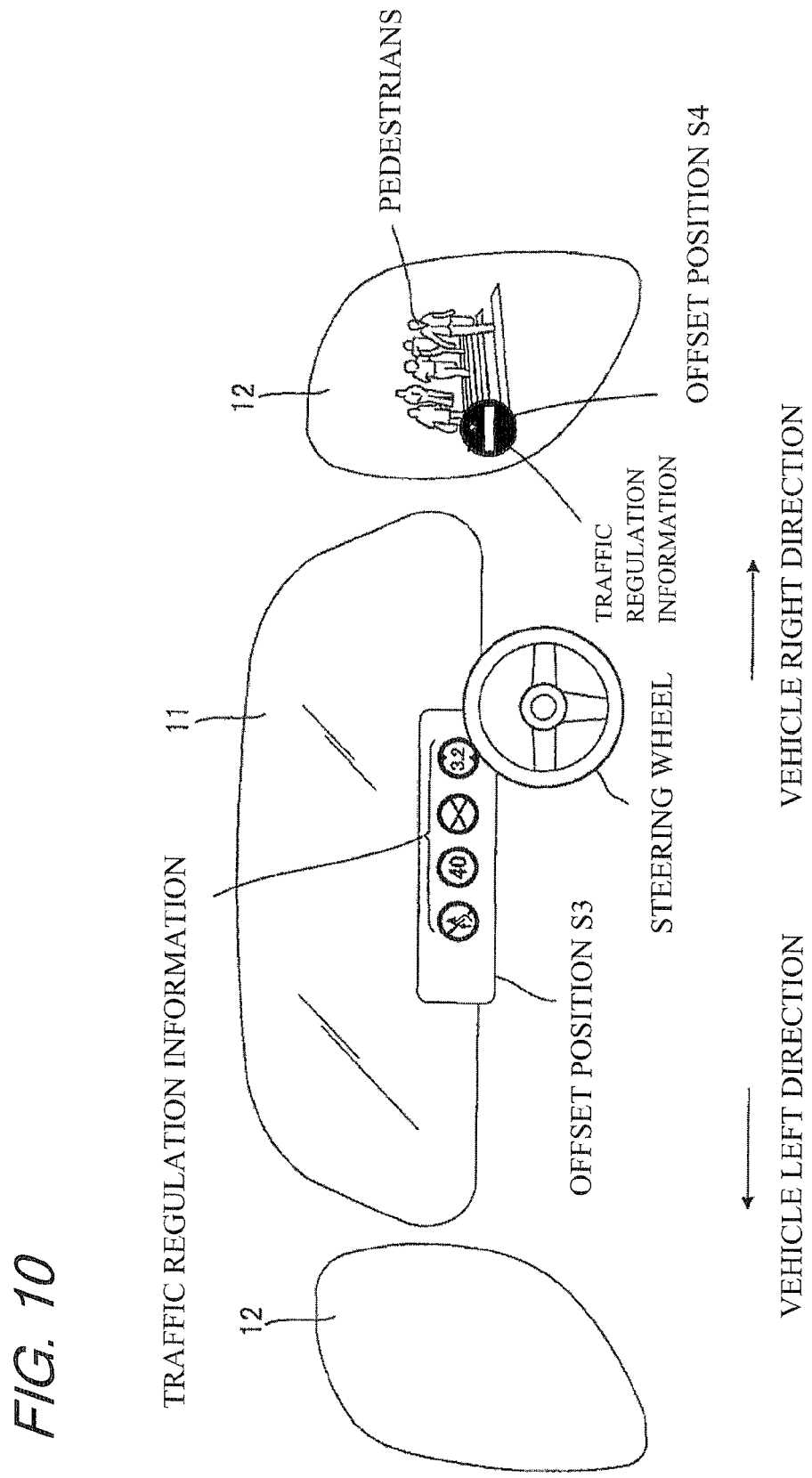
FIG. 10 is a view seen from the driver side showing one example of display on the front windshield and on the side window resulting from the display device of the vehicle information display system pertaining to the sixth embodiment.

Next, the display control unit 3a of the display device 3 collectively (e.g., arranged along the lower edge of the front windshield 11) displays, in a position S3 (e.g., a position on the lower side of and near the center of the front windshield 11) offset by a predetermined amount from the intersection S on the front windshield 11, the traffic regulation information that has been detected by the awareness information detecting unit 1 (FIG. 10). Here, "collectively displays" includes not only displaying plural pieces of traffic regulation information but also displaying a single piece of traffic regulation information.

This position S3 offset by a predetermined amount is a position that does not obstruct the field of view in the driving operation of the driver and is a position where the driver can reliably become aware.

As described above, in the vehicle information display system 10 pertaining to the sixth embodiment, the display control unit 3a of the display device 3 collectively displays, in the position S3 offset by a predetermined amount from the intersection S on the front windshield 11, the traffic regulation information that has been detected by the awareness information detecting unit 1. Thus, the driver can easily and reliably become aware of traffic regulation information of the road on which the host vehicle is currently traveling. That is, the driver can more reliably become aware, on the front windshield 11, of near-vehicle object information of which the driver should be aware.

Next, a modification of the vehicle information display system 10 pertaining to the sixth embodiment will be described.

In the modification of the vehicle information display system 10 pertaining to the present embodiment, the left/right turn detecting unit 4 detects that the host vehicle (is in a state where the host vehicle) will make a right turn when it receives the right direction signal from the direction indicator device 4a.

When the state where the host vehicle will make a right turn is detected by the left/right turn detecting unit 4, the display control unit 3a of the display device 3 displays, in a position S4 (e.g., the lower side portion of the side window 12) offset by a predetermined amount from the intersection S2 on the side window 12 on the right side, a traffic regulation display (a wrong way display, a right turn prohibited display) that regulates the right turn of the host vehicle (FIG. 10). Thus, the driver can easily and reliably become aware of a traffic regulation of which the driver should be aware when making a right turn.

(Seventh Embodiment)

The vehicle information display system 10 pertaining to the first to third embodiments is configured such that various types of information are displayed on the front windshield 11, but the vehicle information display system 10 pertaining to the seventh embodiment is different in that it is configured such that various types of information are displayed on a rear windshield 13 of the host vehicle.

In the vehicle information display system 10 pertaining to the seventh embodiment, the awareness information detecting unit 1 performs vehicle-to-vehicle communication via the in-vehicle communication device 8 to detect information of a rear vehicle traveling behind the host vehicle.

Here, in the information of the rear vehicle, for example, the inter-vehicle distance between the host vehicle and the rear vehicle, the velocity of the rear vehicle and operation information (accelerating state, decelerating state, forwardly traveling state, steering right state, steering left state) of the rear vehicle are included.

Figure 11:
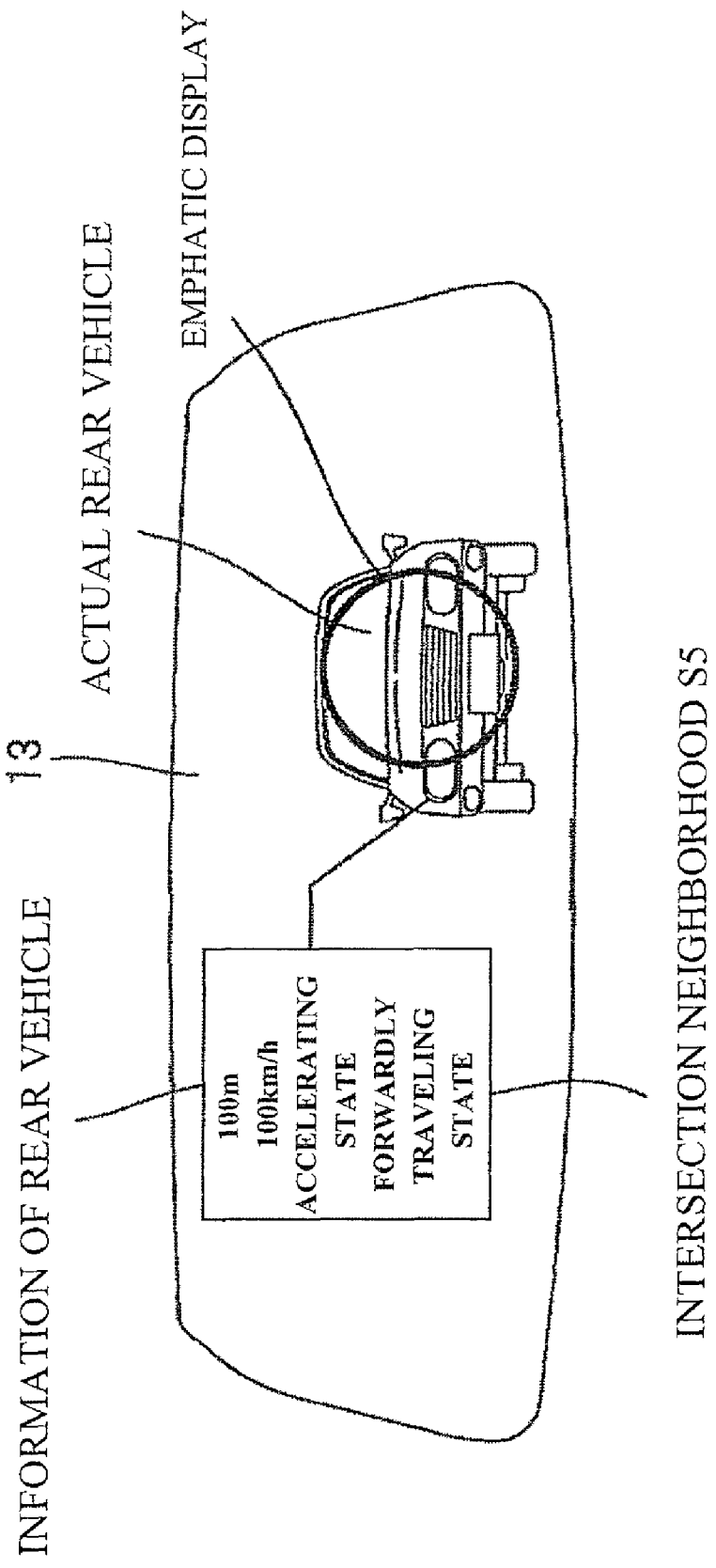
FIG. 11 is a view seen from the driver side showing one example of display on a rear windshield resulting from the display device of the vehicle information display system pertaining to the seventh embodiment.

Then, the display control unit 3a of the display device 3 displays, in a neighborhood S5 of an intersection where an axis interconnecting the position coordinates of the eyes of the driver and the position coordinates of the rear vehicle intersects the rear windshield 13, the information of the rear vehicle (e.g., inter-vehicle distance of 100 m, velocity of 100 km/h, accelerating state, forwardly traveling state) that has been detected by the awareness information detecting unit 1 (FIG. 11). Thus, the driver can easily and reliably become aware of the information of the rear vehicle via a rearview mirror or a side mirror, for example. That is, the driver can more reliably become aware, on the rear windshield 13, of near-vehicle object information of which the driver should be aware.

The display control unit 3a may also display the information of the rear vehicle in the intersection neighborhood S5 on the rear windshield 13 only when the relative velocity of the rear vehicle that has been detected by the awareness information detecting unit 1 becomes equal to or greater than a predetermined velocity (e.g., equal to or greater than about 30 km/h) and the rear vehicle is approaching.

Moreover, the awareness information detecting unit 1 may also have a collision judging unit 1c that judges whether or not the rear vehicle will collide with the host vehicle on the basis of the information of the rear vehicle that has been detected (the inter-vehicle distance and the relative velocity of the rear vehicle with respect to the host vehicle).

For example, the collision judging unit 1c judges whether or not the rear vehicle will collide with the host vehicle using a map that has been set beforehand (a map of the relationship between the inter-vehicle distance and the relative velocity of the rear vehicle) and the inter-vehicle distance and the relative velocity of the rear vehicle that have been detected by the ultrasonic sensor 6.

Then, when it has been judged by the collision judging unit 1c that the rear vehicle will collide with the host vehicle, the display control unit 3a of the display device 3 displays the information of the rear vehicle in the intersection neighborhood S5 on the rear windshield 13 and also displays an emphatic display of that rear vehicle (a surrounding display that surrounds the rear vehicle in a substantially circular red color border). Thus, the driver can more reliably become aware of the potential for the rear vehicle to collide with the host vehicle.

The vehicle information display system 10 may also be configured to use a warning device 16 to issue a warning with respect to the rear vehicle at the same time when it has been judged by the collision judging unit 1c that the rear vehicle will collide with the host vehicle. Here, the warning device 16 may issue a warning sound (horn) with respect to the rear vehicle or may cause warning lights (hazard lights, taillights) to blink ON and OFF.

Moreover, the warning device 16 may also perform vehicle-to-vehicle communication via the in-vehicle communication device 8 to transmit a warning signal to the rear vehicle. When the warning device of the rear vehicle receives that warning signal, it issues an approach warning (warning sound, warning light, warning display, warning vibration, etc.) with respect to the driver.

Next, modifications of the vehicle information display system 10 pertaining to the seventh embodiment will be described.

In the seventh embodiment, the display control unit 3a of the display device 3 displays on the rear windshield 13 information of a rear vehicle that has been detected by the awareness information detecting unit 1 and an emphatic display, but the display control unit 3a of the display device 3 may also display the information of the rear vehicle and the emphatic display on the rearview mirror or a side mirror.

In the seventh embodiment, the awareness information detecting unit 1 detects information of a rear vehicle traveling behind the host vehicle, but the awareness information detecting unit 1 is not limited to this and may also, for example, detect and display on the rear windshield 13 a rear distance between the rear end of the host vehicle and a rear obstacle when the vehicle travels backward (e.g., when backing into a parking space). For example, the driver can easily and reliably back into a parking space using this rear distance as a guide.

Figure 12:
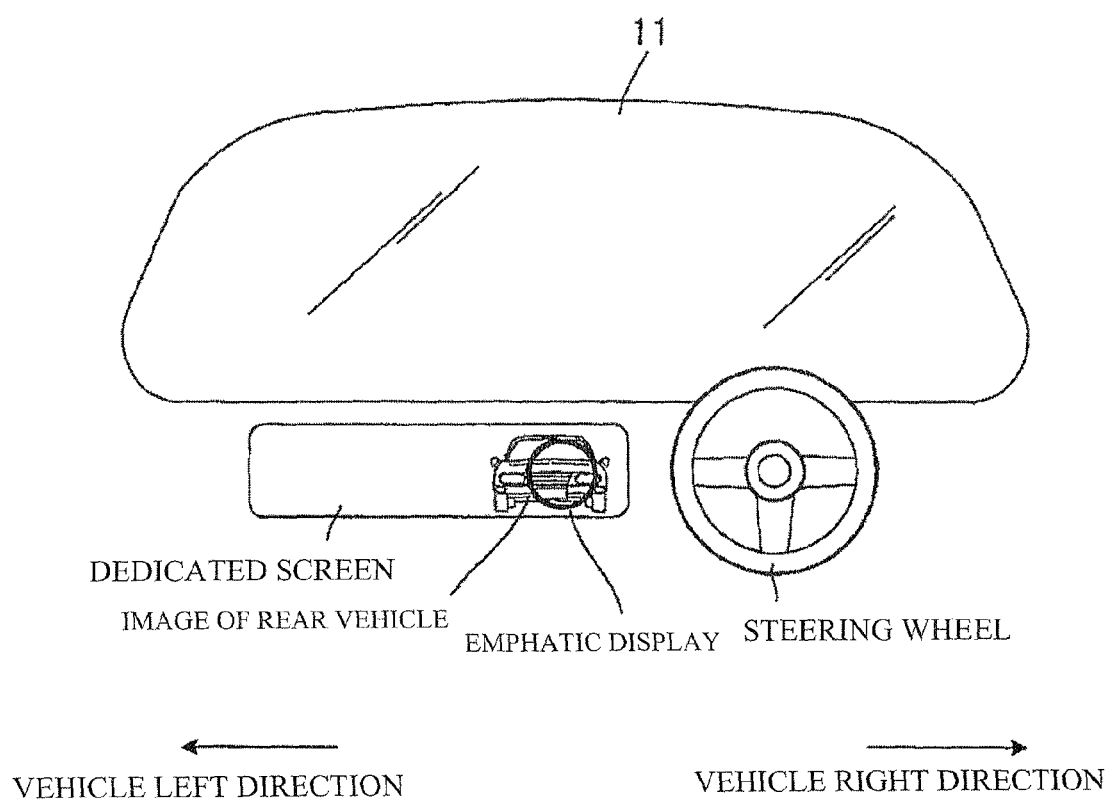
FIG. 12 is a view seen from the driver side showing one example of display on a dedicated screen resulting from the display device of the vehicle information display system pertaining to the seventh embodiment.

In the seventh embodiment, when it is detected by the awareness information detecting unit 1 that the inter-vehicle distance between a rear vehicle and the host vehicle is equal to or less than a predetermined distance and that the rear vehicle is approaching the host vehicle, the display device 3 may display an image of the rear vehicle on a dedicated screen of the vehicle, for example (FIG. 12). Thus, the driver can easily and reliably become aware of a rear vehicle that is approaching the host vehicle.

Moreover, when it has been judged by the collision judging unit 1c that the rear vehicle will collide with the host vehicle, the display device 3 may display an image of the rear vehicle on a dedicated screen and also display an emphatic display of the rear vehicle (e.g., a display surrounding the rear vehicle in a substantially circular red color border) (FIG. 12). Thus, the driver can easily and reliably become aware of a rear vehicle that is approaching, and has the potential to collide with, the host vehicle.

The present invention has been described above with reference to exemplary embodiments, but it will be understood by those skilled in the art that various changes may also be made and that various elements may also be replaced with equivalents without departing from the scope of the present invention. Moreover, many changes can be made to adapt particular situations or materials to the teachings of the present invention without departing from the gist of the present invention. Consequently, the present invention is not intended to be limited to the particular embodiments disclosed as the best modes contemplated for implementation, and the present invention includes all embodiments in the category of the scope of the claims.

For example, in the vehicle information display system 10 pertaining to the first to fourth embodiments, the invention is applied to a state where the host vehicle is in a right turn waiting state or will make a right turn, but the invention is also applicable to a state where the host vehicle is in a left turn waiting state or will make a left turn.

Further, in the fourth to sixth embodiments, the display control unit 3a of the display device 3 displays information of an awareness object on the side window 12 on the front side of the vehicle, but the display control unit 3a of the control device 3 may also display information of an awareness object on side windows on the rear side of the vehicle. That is, the invention is also applicable to arbitrary vehicle glasses that the driver sees.

Moreover, in the first to seventh embodiments, one vehicle interior camera 2a and one vehicle exterior camera 1a are used, but the invention may also have a configuration that uses plural (e.g., two) vehicle interior cameras 2a and plural (e.g., two) vehicle exterior cameras 1a.

The invention claimed is:

1. A vehicle information display system comprising:
   awareness information detecting means that detects information of an awareness object of which a driver should be aware near a host vehicle;
   eye position detecting means that detects the position of the eyes of the driver; and
   display means that displays on a vehicle glass at least one of the information of the awareness object that has been detected by the awareness information detecting means and an emphatic display,
   wherein the display means displays, in an intersection where an axis interconnecting the position of the eyes of the driver that has been detected by the eye position detecting means and the awareness object of which the driver should be aware intersects the vehicle glass or in a neighborhood of that intersection, the information of the awareness object that has been detected by the awareness information detecting means or the emphatic display,
   wherein the awareness information detecting means detects a rear vehicle that is approaching the host vehicle from behind, and
   when the approaching rear vehicle has been detected by the awareness information detecting means, the display means display on a rear windshield information of the rear vehicle.

2. The vehicle information display system according to claim 1, further comprising left/right turn detecting means that detects a left turn waiting state or a right turn waiting state of the host vehicle, wherein when the right turn waiting state has been detected by the left/right turn detecting means, the display means displays on a front windshield the information of the awareness object that is positioned behind an oncoming vehicle that is oncoming with respect to the host vehicle.

3. The vehicle information display system according to claim 1, further comprising left/right turn detecting means that detects a left turn waiting state or a right turn waiting state of the host vehicle, wherein when the left turn waiting state or the right turn waiting state has been detected by the left/right turn detecting means, the awareness information detecting means detects information of a pedestrian who is present on or near a path of travel when the host vehicle makes a left turn or a right turn, and the display means displays on a side window the information of the pedestrian or the emphatic display.

4. The vehicle information display system according to claim 1, wherein the awareness information detecting means detects information of an invisible object that is hidden behind an obstacle near the host vehicle and which the driver cannot see, and the display means displays on a front windshield or on a side window the information of the invisible object that has been detected by the awareness information detecting means.

5. The vehicle information display system according to claim 1, wherein the awareness information detecting means detects traffic regulation information of a road on which the host vehicle travels, and the display means collectively displays, in a position offset by a predetermined amount from the intersection where the axis intersects the vehicle glass, the traffic regulation information that has been detected by the awareness information detecting means.

6. The vehicle information display system according to claim 5, further comprising left/right turn detecting means that detects that the host vehicle will make a left turn or a right turn, wherein when it has been detected by the left/right turn detecting means that the host vehicle will make a left turn or a right turn, the display means displays on a side window the traffic regulation information that regulates the left turn or the right turn of the host vehicle that has been detected by the awareness information detecting means.

7. The vehicle information display system according to claim 1, wherein the awareness information detecting means has a collision judging unit that judges whether or not a rear vehicle that is approaching the host vehicle will collide with the host vehicle, and when it has been detected by the collision judging unit that the rear vehicle will collide with the host vehicle, the display means displays on a rear windshield information of the rear vehicle and the emphatic display.

8. The vehicle information display system according to claim 1, wherein the information of the awareness object includes at least one of attribute information, velocity information, traveling direction information, position information and operation information of the awareness object.

9. The vehicle information display system according to claim 1, further comprising right turn required-amount-of-time setting means that sets a right turn required-amount-of-time that is required for the driver to turn the host vehicle right, wherein the display means varies its display aspect when displaying the information of the awareness object on the vehicle glass on the basis of the right turn required-amount-of-time of the driver that has been set by the right turn required-amount-of-time setting means.

10. A vehicle information display system comprising:
  awareness information detecting means that detects information of an awareness object of which a driver should be aware near a host vehicle;
  eye position detecting means that detects the position of the eyes of the driver; and
  display means that displays on a vehicle glass at least one of the information of the awareness object that has been detected by the awareness information detecting means and an emphatic display,
  wherein the display means displays, in an intersection where an axis interconnecting the position of the eyes of the driver that has been detected by the eye position detecting means and the awareness object of which the driver should be aware intersects the vehicle glass or in a neighborhood of that intersection, the information of the awareness object that has been detected by the awareness information detecting means or the emphatic display,
  wherein the awareness information detecting means has a collision judging unit that judges whether or not a rear vehicle that is approaching the host vehicle will collide with the host vehicle, and
  when it has been detected by the collision judging unit that the rear vehicle will collide with the host vehicle, the display means displays on a rear windshield information of the rear vehicle and the emphatic display.

11. The vehicle information display system according to claim 10,
  further comprising left/right turn detecting means that detects a left turn waiting state or a right turn waiting state of the host vehicle,
  wherein when the right turn waiting state has been detected by the left/right turn detecting means, the display means displays on a front windshield the information of the awareness object that is positioned behind an oncoming vehicle that is oncoming with respect to the host vehicle.

12. The vehicle information display system according to claim 10,
  further comprising left/right turn detecting means that detects a left turn waiting state or a right turn waiting state of the host vehicle,
  wherein when the left turn waiting state or the right turn waiting state has been detected by the left/right turn detecting means, the awareness information detecting means detects information of a pedestrian who is present on or near a path of travel when the host vehicle makes a left turn or a right turn, and
  the display means displays on a side window the information of the pedestrian or the emphatic display.

13. The vehicle information display system according to claim 10,
  wherein the awareness information detecting means detects information of an invisible object that is hidden behind an obstacle near the host vehicle and which the driver cannot see, and
  the display means displays on a front windshield or on a side window the information of the invisible object that has been detected by the awareness information detecting means.

14. The vehicle information display system according to claim 10,
  wherein the awareness information detecting means detects traffic regulation information of a road on which the host vehicle travels, and
  the display means collectively displays, in a position offset by a predetermined amount from the intersection where the axis intersects the vehicle glass, the traffic regulation information that has been detected by the awareness information detecting means.

15. The vehicle information display system according to claim 14,
  further comprising left/right turn detecting means that detects that the host vehicle will make a left turn or a right turn,
  wherein when it has been detected by the left/right turn detecting means that the host vehicle will make a left turn or a right turn, the display means displays on a side window the traffic regulation information that regulates the left turn or the right turn of the host vehicle that has been detected by the awareness information detecting means.

16. The vehicle information display system according to claim 10,
  wherein the awareness information detecting means detects a rear vehicle that is approaching the host vehicle from behind, and
  when the approaching rear vehicle has been detected by the awareness information detecting means, the display means displays on a rear windshield information of the rear vehicle.

17. The vehicle information display system according to claim 10, wherein the information of the awareness object includes at least one of attribute information, velocity information, traveling direction information, position information and operation information of the awareness object.

18. The vehicle information display system according to claim 10,
  further comprising right turn required-amount-of-time setting means that sets a right turn required-amount-of-time that is required for the driver to turn the host vehicle right,
  wherein the display means varies its display aspect when displaying the information of the awareness object on the vehicle glass on the basis of the right turn required-amount-of-time of the driver that has been set by the right turn required-amount-of-time setting means.

* * * * *